United States Patent
Wilson et al.

(10) Patent No.: US 9,527,780 B2
(45) Date of Patent: Dec. 27, 2016

(54) ENHANCING BIOCHAR PERFORMANCE USING PYROLYSIS ACID STREAM

(71) Applicant: Cool Planet Energy Systems, Inc., Camarillo, CA (US)

(72) Inventors: Richard W. Wilson, San Diego, CA (US); Wilson Hago, Camarillo, CA (US); Ranko Panayotov Bontchev, Camarillo, CA (US)

(73) Assignee: Cool Planet Energy Systems, Inc., Greenwood Village, CO (US)

( * ) Notice: Subject to any disclaimer, the term of this patent is extended or adjusted under 35 U.S.C. 154(b) by 0 days.

(21) Appl. No.: 14/286,261

(22) Filed: May 23, 2014

(65) Prior Publication Data

US 2014/0345343 A1    Nov. 27, 2014

Related U.S. Application Data

(60) Provisional application No. 61/827,257, filed on May 24, 2013.

(51) Int. Cl.
| | | |
|---|---|---|
| *C01B 31/02* | (2006.01) | |
| *C05F 11/00* | (2006.01) | |
| *C05F 11/02* | (2006.01) | |

(52) U.S. Cl.
CPC ............... *C05F 11/00* (2013.01); *C01B 31/02* (2013.01); *C05F 11/02* (2013.01); *Y02E 50/14* (2013.01); *Y02E 50/343* (2013.01)

(58) Field of Classification Search
CPC .................................. C01B 31/02; C05F 11/02
See application file for complete search history.

(56) References Cited

U.S. PATENT DOCUMENTS

| | | |
|---|---|---|
| 4,153,514 A | 5/1979 | Garrett et al. |
| 4,495,165 A | 1/1985 | Gurza |
| 8,317,891 B1 | 11/2012 | Cheiky et al. |
| 8,361,186 B1 | 1/2013 | Shearer et al. |
| 8,431,757 B2 | 4/2013 | Cheiky et al. |
| 2012/0103040 A1* | 5/2012 | Wolf et al. ........................ 71/24 |
| 2012/0283493 A1 | 11/2012 | Olson et al. |
| 2012/0304719 A1 | 12/2012 | Cheiky et al. |
| 2014/0161709 A1* | 6/2014 | Karthikeyan ............. 423/445 R |

FOREIGN PATENT DOCUMENTS

| | | |
|---|---|---|
| WO | WO-2011097183 A2 | 8/2011 |
| WO | WO-2011143380 A2 | 11/2011 |

OTHER PUBLICATIONS

International Search Report and Written Opinion issued by the U.S. Patent and Trademark Office as International Searching Authority for International Application No. PCT/US14/39287 mailed Sep. 23, 2014 (10 pgs.).

* cited by examiner

*Primary Examiner* — Stuart Hendrickson
(74) *Attorney, Agent, or Firm* — Wilmer Cutler Pickering Hale and Dorr LLP

(57) ABSTRACT

A method of producing a modified biochar and the use of the biochar as a soil amendment. The modified biochar can be produced by contacting biochar with an acid-containing solution obtained from an acid containing stream produced in a pyrolysis process, which produces biochar. In accordance with one aspect, a cellulose-containing biomass is pyrolyzed to generate a gaseous organic acid-containing stream, which is condensed to produce an organic acid-containing solution. The biochar is then modified by contact with the organic acid-containing solution.

29 Claims, 5 Drawing Sheets

Step 1: Neutralization by vacuum impregnation

Step 2: Washing (flushing) by vacuum filtration

ENHANCING BIOCHAR PERFORMANCE USING PYROLYSIS ACID STREAM

RELATED APPLICATION

This application claims the benefit of priority under 35 U.S.C. §119(c) to U.S. Ser. No. 61/827,257, filed May 24, 2013, entitled "Enhancing Biochar Performance Using Pyrolysis Acid Stream," the contents of which are hereby incorporated by reference.

TECHNICAL FIELD

The present application relates to methods for enhancing biochar performance, and more particularly, to modifying biochar by contacting the biochar with an organic acid containing stream derived from a pyrolysis process for producing biochar.

BACKGROUND

Pyrolysis is the process of thermally decomposing an organic material in either a reduced oxygen environment or an oxygen-free environment. Pyrolyzing wood and other forms of mixed biomass ultimately produces a carbonaceous compound called biochar and a mixture of gases including hydrocarbons, oxygenates, water, hydrogen, carbon monoxide and carbon dioxide. If the vapors are condensed, the liquid produced is sometimes referred to as bio-oil and the volatile gases are sometimes referred to as synthesis gas (syngas).

Biomass, such as cellulose, hemicelluloses, lignin, starches, and lipids, proceeds through multiple steps of decomposition when subject to the pyrolysis process. In general, when conducted at high temperatures (e.g., 800° C.) for prolonged periods of time, pyrolysis ultimately yields syngas. As the temperature and exposure time interval is reduced, an increasing amount of biochar residue remains. At still lower temperatures and time intervals, increasingly complex hydrocarbons and oxygenated hydrocarbons are present in the gas stream from the pyrolyzed biomass.

Wood vinegar, also known as pyroligneous acid, may be extracted as a by-product in the manufacture of biochar from cellulose containing biomass. It typically is produced as the first cut, after water, in the pyrolysis of cellulosic biomass and is usually generated at temperatures below 320° C. Wood vinegar typically is about 80-90% water and contains acetic acid, methanol and acetone in addition to a number of other compounds, including carboxylic acids and other organic acids. The pyrolysis stream containing wood vinegar is usually discarded.

In other pyrolysis systems, the biomass is pretreated prior to the pyrolysis and leads to a waste stream(s) with organic acids. This can be a separate pyrolysis step known as torrefaction, where the biomass is heated to moderate temperatures, generally between 200° C. and 320° C., and releases water and organic acids from the biomass and leaves the process as a waste stream. Another pretreatment step often utilized is pre-washing the biomass with acid and/or hot water, which also produces a waste stream containing water and acid.

Additionally, the vapors produced from pyrolysis contain organic acids, including but not limited to acetic acid, formic acid, propionic acid, glycolic acid, and other carboxylic acids. Additionally these vapors may also contain inorganic acids, including but not limited to hydrochloric acid. Dependent on downstream processing steps, a waste stream with organic acids, like acetic acid, and potentially inorganic acids, like hydrochloric acid, and water may be created downstream of the pyrolysis reaction from this pyrolysis vapor stream. This waste stream is typically just discarded as well.

It would be beneficial to utilize any of these discarded acid containing by-products of pyrolysis.

SUMMARY

Described herein is a method of using typically discarded by-product streams from pyrolysis to produce a modified biochar, which can be used as a soil amendment. The modified biochar can be produced by contacting biochar with an acid stream derived from a pyrolysis process for producing biochar. In accordance with one aspect, a cellulose-containing biomass is pyrolyzed to generate a gaseous organic acid-containing stream, which is condensed to produce an acid-containing solution. The biochar is then modified by being brought into contact with the acid-containing solution. The biochar that is modified may be from the same process used to generate the acid-containing solution or from a different process for producing biochar.

Also disclosed is a method of treating soil by applying a biochar and a acid-containing solution to the soil. The organic acid-containing solution can be produced by condensing a gaseous organic acid-containing stream produced from the pyrolysis of a cellulose-containing biomass. The biochar and acid-containing solution can be applied to the soil separately or as a combination. In accordance with certain aspects, modified biochar is applied to the soil, wherein the modified biochar is produced by contacting the biochar with the acid-containing solution. In accordance with particularly useful aspects, the modified biochar is produced by vacuum impregnation.

BRIEF DESCRIPTION OF THE DRAWINGS

The subject matter is described with reference to the following figures, which are presented for the purpose of illustration only and are not intended to be limiting of the invention.

DETAILED DESCRIPTION

Figure 1:
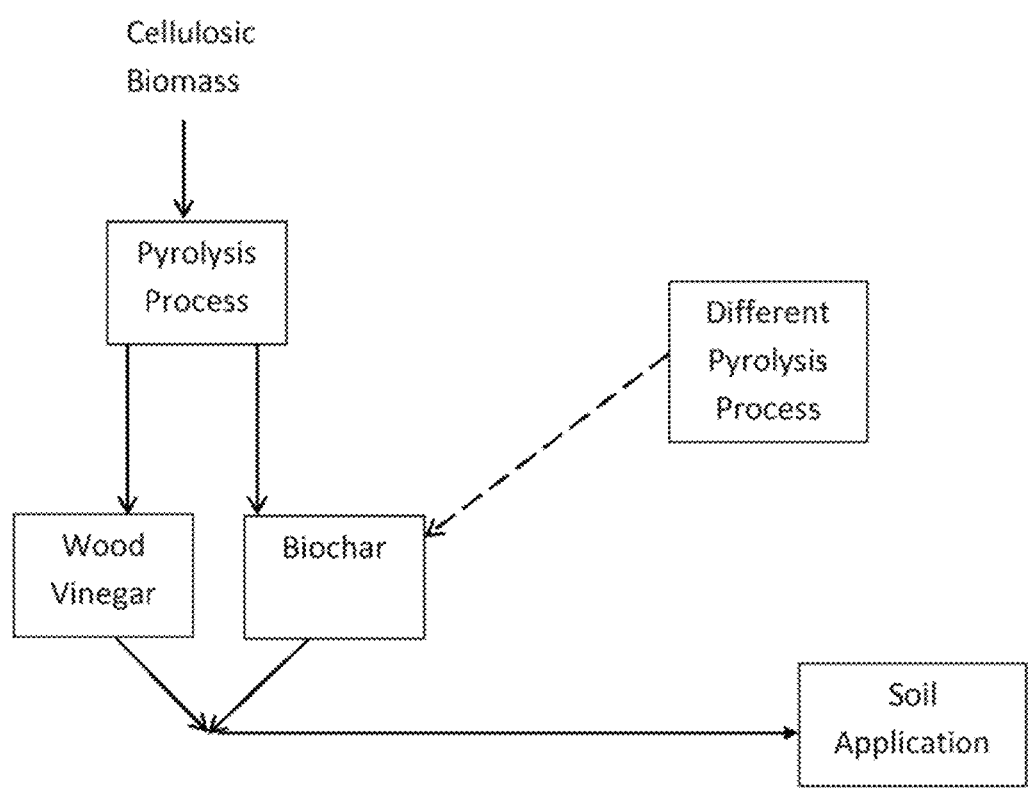
FIG. 1 is a diagram illustrating one embodiment wherein wood vinegar and biochar from a pyrolysis process are mixed and applied to soil.

Pyrolysis refers to the thermochemical decomposition of organic material at elevated temperatures in an environment with limited amounts of an oxidizing agent or in the absence of an oxidizing agent, such as oxygen. The temperatures and rate of temperature change vary depending on the type of biomass being treated, the desired products, etc. Pyrolysis primarily yields water, syngas, light organic compounds, heavy organic compounds, and biochar. Some of the said organic compounds are acids. In addition, other acids that are non-organic in nature are sometimes obtained from the pyrolysis process. In certain embodiments, acids such as hydrogen chloride are a by-product of the pyrolysis of biomass.

Biochar is primarily carbon and degrades very slowly. It typically has a relatively high surface area with various channels, voids and pores. Biochar can be used as a soil amendment to enhance the nutrient retention capacity and other properties of soils, and thereby improve crop yields. Biochar application to soil appears to have little effect on the carbon-nitrogen balance. Rather, it holds back water and nutrients so as to make them available to soil biota and growing plants.

The term "biomass" refers to any cellulosic or lignocellulosic material and includes materials comprising cellulose, and optionally further comprising hemicellulose, lignin, starch, oligosaccharides and/or monosaccharides. Biomass may also comprise additional components, such as protein and/or lipid. Biomass may be derived from a single source, or biomass can comprise a mixture derived from more than one source; for example, biomass could comprise a mixture of corn cobs and corn stover, or a mixture of grass and leaves. Biomass includes, but is not limited to, bioenergy crops, agricultural residues, municipal solid waste, industrial solid waste, sludge from paper manufacture, yard waste, wood and forestry waste or a combination thereof. Examples of biomass include, but are not limited to, corn grain, corn cobs, crop residues such as corn husks, corn stover, grasses, wheat, wheat straw, barley, barley straw, hay, rice straw, switchgrass, waste paper, sugar cane bagasse, sorghum, soy, components obtained from milling of grains, trees, branches, roots, leaves, wood chips, sawdust, shrubs and bushes, vegetables, fruits, flowers, and animal manure or a combination thereof. In one embodiment, biomass that is particularly useful includes biomass that has a relatively high carbohydrate value, is relatively dense, and/or is relatively easy to collect, transport, store and/or handle. In one embodiment, biomass that is useful includes corn cobs, corn stover, sawdust, and sugar cane bagasse.

The term 'biomass' can also include: (i) waste products including animal manure such as poultry derived waste; (ii) commercial or recycled material including plastic, paper, paper pulp, cardboard, sawdust, timber residue, wood shavings and cloth; (iii) municipal waste including sewage waste; (iv) agricultural waste such as coconut shells, pecan shells, almond shells, coffee grounds; and (v) agricultural feed products such as rice straw, wheat straw, rice hulls, corn stover, corn straw, and corn cobs.

Although the biomass used to generate biochar is not particularly limited, biomass used for the generation of an organic acid-containing stream typically contains cellulose. Exemplary sources of cellulosic biomass include waste wood or bark, waste tree trunk chips from pulp or paper mills, forest waste (e.g., roots, branches, and foliage), orchard and vineyard trimmings, stalks and leaves (i.e., stover) from cotton plants, bamboo, rice, wheat, and corn, waste agricultural products (e.g., rice, wheat, and corn), agricultural byproducts (e.g., bagasse and hemp), and waste paper (e.g., newspaper, computer paper, and cardboard boxes). In some embodiments, the source of cellulosic biomass is corn stover. Some of these materials (e.g., softwood and hardwood materials and crops) are lignocellulosic materials that contain lignin, cellulose, and hemicellulose. Examples of useful lignocellulosic materials include, but are not limited to, biomass materials containing corn stover, corn cobs, empty fruit bunches, wood, wood residue, sawdust, sugar cane bagasse, switchgrass, sorghum, and/or agricultural crop wastes.

In biochar production, the biomass may be chopped or ground by a variety of techniques into a particle size suitable for the particular pyrolysis system, which may be limited by processing equipment size and thermal transfer rates. In accordance with other embodiments, the biomass may be used with little or no reduction in size.

The biomass may be pretreated either with washing or torrefaction, a mild pyrolysis, before being sent to the main pyrolysis step. In the main pyrolysis step, the biomass may be subjected first to a heating profile, typically a linear temperature ramp, which is typically designed to dewater the biomass. Subsequent heating profiles end at progressively higher temperatures and have the purpose of outgassing and thermochemically converting biomass into useful bio-compounds with progressively higher volatilization temperatures. In order to accomplish this volatilization in a selective manner, the temperature treatment may be accompanied by a pressure treatment. These heating profiles may be accomplished in one or more process steps, which may be in one or more pieces of equipment.

In some embodiments, the temperature profiles are linear ramps ranging from about 0.001° C./sec. to 1000° C./sec. By way of example, pyrolysis may be accomplished with electrical heating elements, direct flame combustion, or by directed jets of heated working gas or supercritical fluid. The heating profile and the pressure compaction profile may be linked via a feedback loop and may be applied by the same agent simultaneously.

The physical characteristics of the biochar will differ depending on the starting biomass material, which can include any of the above-identified materials such as wood, grasses, etc. Different biomass feedstocks are expected to produce different types of biochars, varying in porosity and other physical characteristics. The biomass feedstocks can be fed individually or as mixtures of different feedstocks to produce biochars containing different physical characteristics.

After the biochar is formed, a last processing step is to transfer the biochar out of the reaction chamber for a subsequent storage or filling into a biochar reactor for subsequent optional activation. The transfer may be accomplished via any number of mechanical means.

Figure 5:
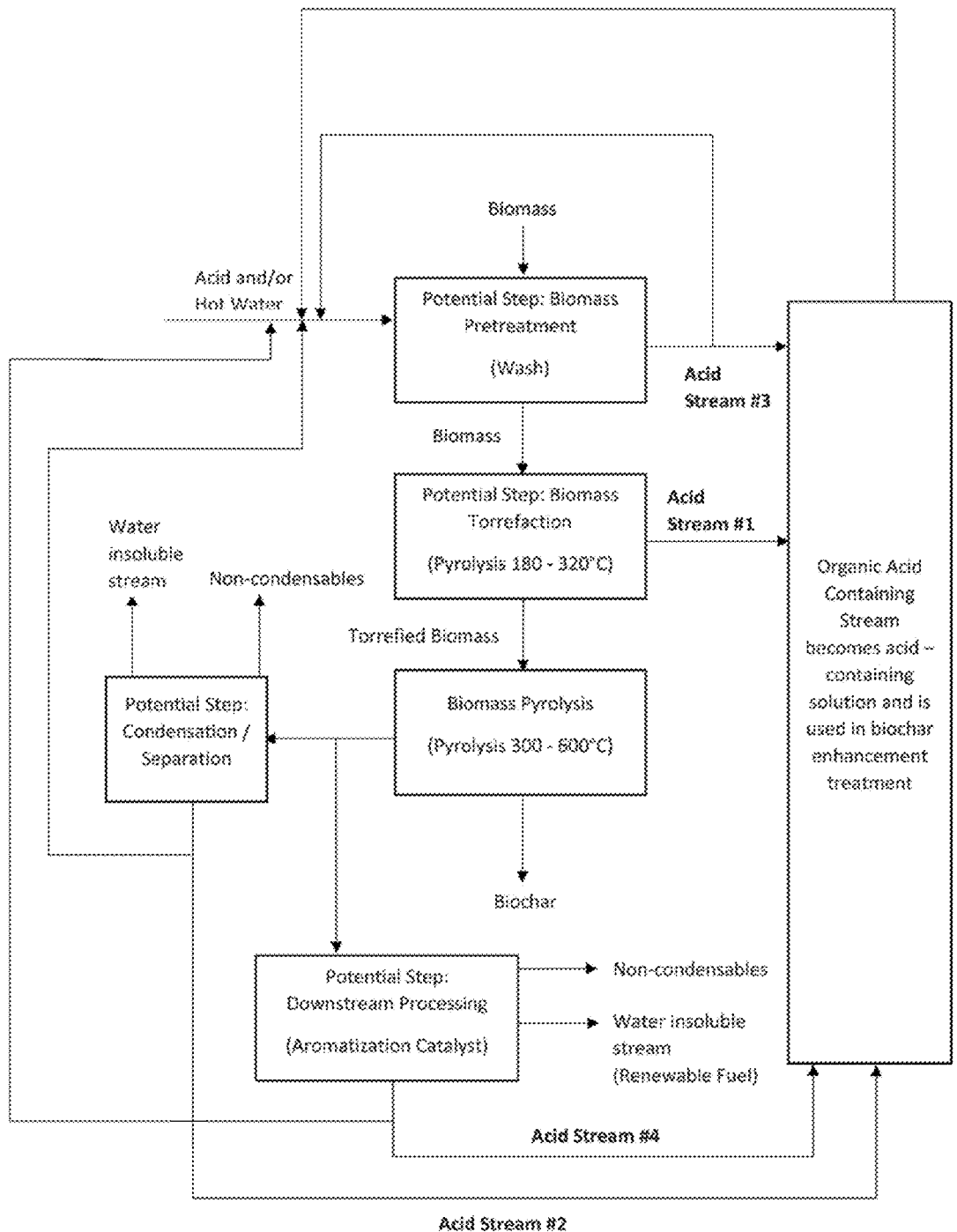
FIG. 5 illustrates various potential stream sources from a pyrolysis process to create an acid containing solution for biochar enhancement.

FIG. 5 illustrates examples of exemplary processing steps in the pyrolysis of biomass that can serve as sources of the acid streams from a pyrolysis process. The steps outlined in the figure are exemplary steps that could be part of the pyrolysis process, but in no way does this figure show all potential steps nor are all the steps illustrated required for the pyrolysis process nor the creation of an acid-containing stream. One embodiment for creating an acid stream from pyrolysis process is directly from the pyrolysis reaction. As the biomass is heated, various volatile streams are produced and the content of each stream depends on the biomass composition, the temperature control of the pyrolysis reactor and the manner of condensation of evolved gases. These volatile streams can be condensed to produce a liquid stream in addition to biochar from the pyrolysis process. After water, the first stream is typically an organic acid-containing stream that evolves at temperatures below about 320° C. This organic acid-containing stream includes wood vinegar when the initial biomass contains cellulose. This organic acid-containing stream can include, but is not limited to, water and organic-acids, such as acetic acid, formic acid, propionic acid, glycolic acid, and other carboxylic acids.

This initial organic acid stream can be evolved from a mild temperature pyrolysis, often referred to as torrefaction, e.g., between about 180° C. and 320° C. The resulting acid-containing stream from the mild pyrolysis can be collected directly from the pyrolysis reactor used to create biochar. In other embodiments, the acid stream is obtained in a pretreatment step in the pyrolysis process, as illustrated in FIG. 5 as "Acid Stream #1".

Alternatively or additionally, the vapors evolved from pyrolysis at higher temperatures, e.g., between about 300° C. and 600° C., can be condensed and water-insoluble fractions and non-condensable fractions can be separated from the aqueous fraction to form an acid-containing stream, as illustrated in FIG. 5 as "Acid Stream #2". A portion of or the entire produced acid-containing stream can be used to form an acid-containing solution, which is then added to biochar produced during the same pyrolysis process or biochar from a different pyrolysis process to provide an enhanced biochar that is particularly useful as a soil amendment.

Depending on the pyrolysis system, an acid stream can also be derived from a pretreatment step, e.g., processing of the biomass prior to pyrolysis, or from downstream processing steps of the evolved gases from pyrolysis vapors. An exemplary pretreatment is washing the biomass prior to pyrolysis. Biomass washing is carried out with an acid and/or hot water, which can be fresh or recycled from the washing treatment, the pyrolysis process, or the biochar enhancement process. This acid containing stream is illustrated in FIG. 5, as "Acid Stream #3". An exemplary downstream processing step of the pyrolysis vapors, includes reacting the vapors evolved from pyrolysis over an aromatization catalyst to create a renewable fuel and water. This water stream contains acids, which can be recovered to derive an acid-containing solution for biochar enhancement. The resulting acid-containing stream is illustrated in FIG. 5 as "Acid Stream #4". Further details of post pyrolysis processing can be seen in co-owned, U.S. Pat. No. 8,431,757, entitled "Method for Making Renewable Fuels", the content which is incorporated herein by reference in its entirety.

The acid containing streams can include, but are not limited to, water, organic acids, and inorganic acids. Examples of typical organic acids found in theses streams are acetic acid, formic acid, propionic acid, glycolic acid, and other carboxylic acids. An example of a typical inorganic acid found in these streams is hydrochloric acid.

Depending on the biomass source, unmodified biochar may have a relatively high pH that could be render the biochar unsuitable as a soil amendment. In some cases, the basic nature of the biochar is attributable to residual ash content in the biochar. The present application describes various methods for modifying the pH of the biochar utilizing an acid-containing solution derived from a biochar production process. In accordance with certain embodiments, the acidic solution may be added to the biochar in an amount sufficient to modify the pH of the biochar to values more suitable for use as a soil amendment.

Various factors can be taken into consideration and modified as needed to provide an appropriate adjustment of the biochar pH. For example, the pH, composition, and concentration of the acid-containing solution may vary significantly from one biochar production process to another. The acid-containing solution may have a pH in the range of 1 to 5. Furthermore, the wood vinegar or other acid-containing solution can be modified by adjusting the pH and concentration of the solution used to impregnate or otherwise modify the biochar. For example, the acid-containing solution can be concentrated or diluted to provide a particular concentration. In accordance with certain aspects, the water content of the acid-containing solution may range from about 10% to near 100%, more particularly about 80% to near 100%, and still more particularly 95% to 99.9%.

In accordance with certain embodiments, the modified biochar can be washed with water, more particularly deionized water, to enable better control of the pH of the modified biochar. The biochar may be subjected to repeated or continuous flushing with water until the desired pH for the biochar is obtained. In accordance with certain embodiments, the pH of the modified biochar may be about 5.0 to 9, more particularly about 6.0 to 7.5, and still more particularly about 6.5 to 7.0.

As shown in FIG. 1, one embodiment involves pyrolysis of a cellulosic biomass to produce wood vinegar that can be mixed with biochar and applied to soil to improve properties of the soil. The biochar can be produced in the same procedure as the wood vinegar or from a different pyrolysis process. Biochar produced from a different process does not need to be from a process limited to cellulosic biomass, any biomass would be suitable.

Figure 2:
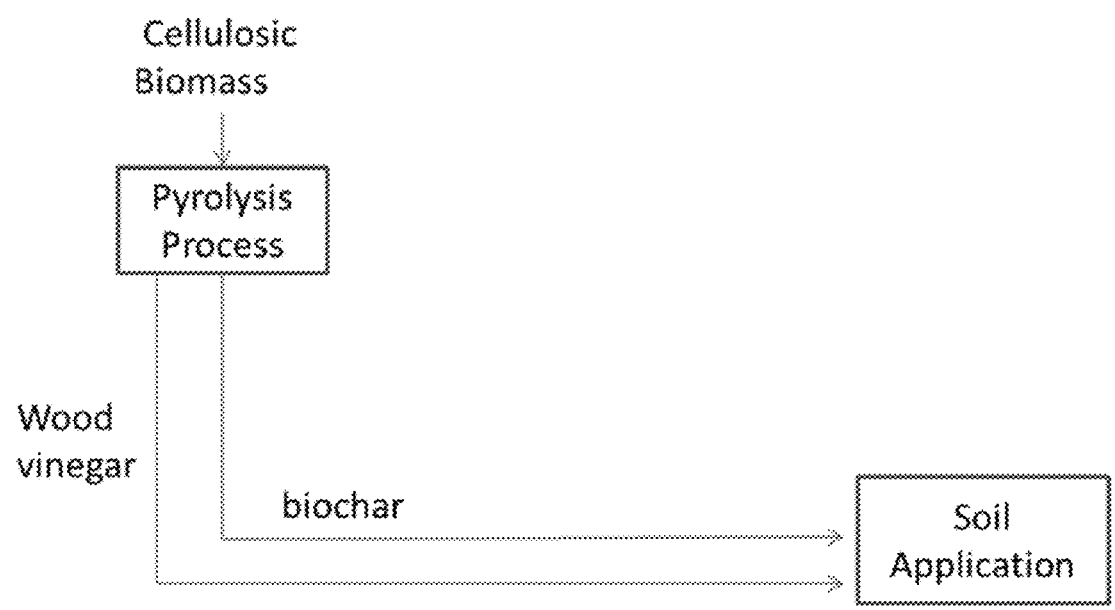
FIG. 2 is a diagram illustrating another embodiment wherein wood vinegar and biochar from a pyrolysis process are separately applied to soil.

FIG. 2 illustrates another embodiment wherein the wood vinegar and biochar are separately applied to soil. The presence of the wood vinegar in the soil in combination with the biochar enhances biochar performance as a soil amendment. Again, the biochar does not need to be from the same process as used to generate the wood vinegar.

In accordance with certain embodiments, the biochar and an organic acid-containing solution from the pyrolysis process are mixed to form a modified biochar. Various techniques may be used to contact the acid-containing solution with the biochar. Specific examples of suitable techniques include, but are not limited to, immersion impregnation, spray impregnation, and vacuum impregnation, and the selected process may be effected repeatedly. Vacuum impregnation is particularly useful for modifying the biochar with the organic acid-containing solution. Vacuum impregnation of the biochar with at least a portion of the organic acid-containing solution includes placing the biochar into a vacuum chamber, reducing the pressure in the chamber and introducing the organic acid-containing solution into the chamber to impregnate the biochar.

Figure 3:
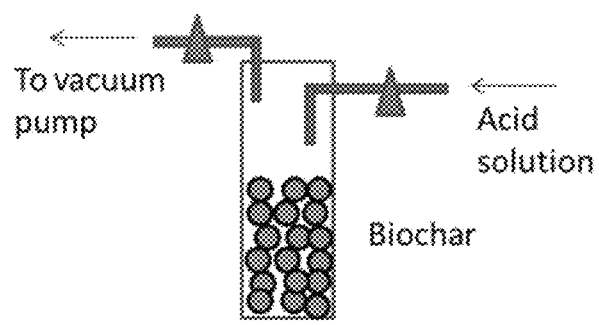
FIG. 3 illustrates an example of a system that can be utilized for vacuum impregnation of biochar with an organic acid-containing stream.
Figure 3:
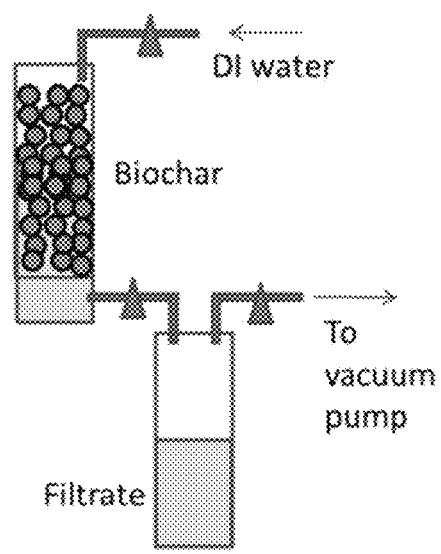

FIG. 3 illustrates an example of a system that can be used for vacuum impregnation in accordance with certain embodiments. The system includes a vacuum chamber connected by valved lines to a vacuum pump, not shown, and the acid solution. The acid solution line may also be connected to a pressure source which could be either connected to the atmosphere or to an inert gas source, not shown. The locations of the various lines and valves should not be dictated by their locations shown in FIG. 3. The impregnation process illustrated FIG. 3 begins with the biochar being placed in the vacuum chamber. Then, the interior of the vacuum chamber is evacuated by the action of the vacuum pump acting through the vacuum line. Once the chamber is evacuated, the vacuum line valve is closed and the line connection to the acid-containing impregnation solution is opened to allow solution into the chamber until the biochar is covered with the solution. After an impregnation time of from about 1 sec to 24 hrs, and more particularly from about 1 min to 60 min, the solution which has not been absorbed by the material is drained off or poured off.

In accordance with certain aspects, the biochar can be further processed by flushing with water, preferably deionized water, as shown in step 2 of FIG. 3. As shown, the DI water is flushed through the biochar and the filtrate is collected in a separate container connected by another valved line. The filtrate container is also connected to a vacuum pump to facilitate flushing of the biochar with water. The filtrate can be monitored to provide an indication of the pH of the biochar as it is being washed.

Figure 4:
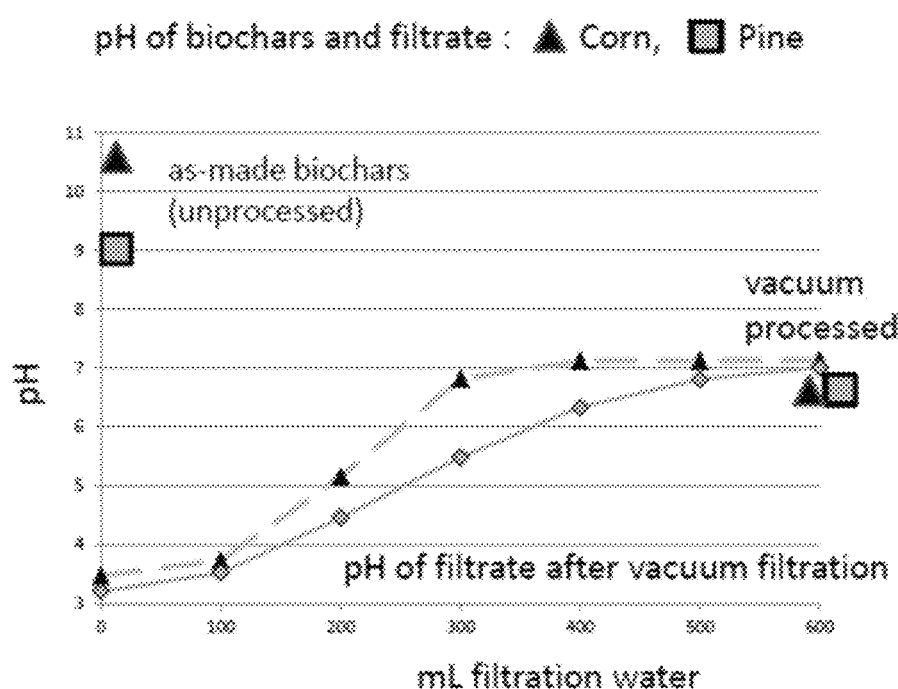
FIG. 4 provides a graph of pH as a function of filtration water volume for biochars modified with acetic acid.

FIG. 4 illustrates how the pH of the modified biochar can be controlled by measuring the pH of the filtrate during washing of the biochar. Measurements were made by mixing 5 g of biochar with 100 mL DI water with pH=7 in a 120 mL plastic vial and letting the suspension equilibrate for 2 hours upon vigorous shaking (tumbling). The pH of the suspension was measured after 2 hours using a standard lab pH meter (Oakton, pH11 series). Corn and red fir biochars have been measured according to the above procedure before and after vacuum infiltration with acid, followed by vacuum filtration.

The filtration experiment was conducted by filtering the vacuum acid infiltrated biochars under vacuum with 100 mL portions of DI water and then measuring the pH of each portion. Filtration/pH measurements continued until the pH of the last 100 mL portion was equal to that of the DI water used for washing or of water containing the desired pH (FIG. 4)

Soil pH tends to modify the bioavailability of plant nutrients. Some soils are inherently acidic or basic in nature and soil amendments need to be prepared taking into consideration the effect on soil acidity. Unmodified biochar is typically basic and the addition of this basic biochar to a soil can be detrimental to the soil.

The modified biochar and/or combination of biochar and acid-containing solution disclosed herein can be used to facilitate management of soil pH. The modified biochar can be produced at a wide range of pH values to provide the appropriate balance for a particular soil composition and proposed use for the soil.

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above, and is limited only by the claims which follow.

What is claimed is:

1. A method of producing a modified biochar comprising:
   a) obtaining an acid-containing solution from a stream produced in a process for pyrolyzing biomass, wherein the acid-containing solution is produced from pyrolysis at temperatures between 300° C. and 600° C.; and
   b) contacting a biochar with at least a portion of the acid-containing solution to provide a modified biochar.

2. The method of claim 1, wherein the acid-containing stream is produced from mild pyrolysis of the biomass at temperatures below 320° C.

3. The method of claim 2, further comprising pyrolyzing the resulting mildly pyrolyzed biomass at higher temperatures to produce biochar.

4. The method of claim 3, wherein the mild pyrolysis step occurs at a different location than the biochar producing pyrolysis.

5. The method of claim 1, wherein the acid-containing stream is obtained from a biomass wash prior to pyrolysis.

6. The method of claim 5, wherein the biomass washing occurs at a different location than the biochar producing pyrolysis process.

7. The method of claim 5, wherein the biomass wash comprises an acid.

8. The method of claim 7, wherein some or all of the acid is recycled from a step in the pyrolysis process.

9. The method of claim 7, wherein some or all of the acid is recycled from a step in the biochar modification process.

10. The method of claim 5, wherein the biomass wash comprises water.

11. The method of claim 10, wherein some or all of the water is recycled from a step in the pyrolysis process.

12. The method of claim 10, wherein some or all of the water is recycled from a step in the biochar modification process.

13. The method of claim 1, wherein the acid-containing stream is produced from downstream processing of vapors evolved from biomass pyrolysis.

14. The method of claim 13, wherein the acid-containing stream is separated from a water insoluble stream.

15. The method of claim 1, wherein the biomass comprises a lignocellulosic material.

16. The method of claim 15, wherein the lignocellulosic material comprises one or more of corn stover, corn cobs, empty fruit bunches, wood, wood residue, sawdust, sugar cane bagasse, switchgrass, sorghum, and agricultural crop wastes.

17. The method of claim 1, wherein the acid-containing solution comprises an organic acid.

18. The method of claim 17, wherein the organic acid-containing solution contains at least one acid selected from the group consisting of acetic acid, formic acid, propionic acid, glycolic acid, and other carboxylic acids.

19. The method of claim 1, wherein the acid-containing solution comprises an inorganic acid.

20. The method of claim 1, wherein the acid-containing solution contains between 10% to nearly 100% water by volume.

21. The method of claim 20, wherein the acid-containing solution contains between 80-100% water by volume.

22. The method of claim 21, wherein the acid-containing solution contains between 95% and 99.9% water by volume.

23. The method of claim 1, wherein the biochar is produced by pyrolysis of the same biomass that is used to generate the acid-containing stream.

24. The method of claim 1, wherein the biochar is produced by pyrolysis of a biomass different than the biomass used to generate the acid-containing stream.

25. The method of claim 1, further comprising contacting the modified biochar with water to adjust the pH of the modified biochar.

26. The method of claim 1, wherein the modified biochar has a pH of about 6.0-7.5.

27. The method of claim 26, wherein the modified biochar has a pH of about 6.5-7.0.

28. The method of claim 1, wherein contacting the biochar with at least a portion of the acid-containing solution comprises vacuum impregnation of the biochar with at least a portion of the acid-containing solution.

29. The method of claim 28, wherein vacuum impregnation of the biochar with at least a portion of the acid-containing solution comprises placing the biochar into one or more vacuum chambers, reducing the pressure in the chambers and introducing the acid-containing solution into the chambers.

* * * * *